(12) United States Patent
Kelly et al.

(10) Patent No.: US 10,584,652 B2
(45) Date of Patent: Mar. 10, 2020

(54) SYSTEM AND METHOD FOR OPERATING AN ENGINE WITH AN ELECTRICALLY DRIVEN COMPRESSOR

(71) Applicant: Ford Global Technologies, LLC, Dearborn, MI (US)

(72) Inventors: Tyler Kelly, Plymouth, MI (US); Anthony Morelli, Troy, MI (US); Patrick Matthews, West Bloomfield, MI (US); Victor Martinez, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 137 days.

(21) Appl. No.: 15/960,011

(22) Filed: Apr. 23, 2018

(65) Prior Publication Data
US 2019/0323442 A1   Oct. 24, 2019

(51) Int. Cl.
| F02D 41/00 | (2006.01) |
| F01P 7/14 | (2006.01) |
| F01P 7/16 | (2006.01) |
| F02B 39/10 | (2006.01) |
| F01M 1/16 | (2006.01) |

(Continued)

(52) U.S. Cl.
CPC ........ *F02D 41/0007* (2013.01); *B60K 11/085* (2013.01); *F01M 1/16* (2013.01); *F01P 7/14* (2013.01); *F01P 7/164* (2013.01); *F02B 39/10* (2013.01); *F01P 2003/003* (2013.01); *F01P 2025/08* (2013.01); *F02D 2200/023* (2013.01)

(58) Field of Classification Search
CPC .. F02D 41/0007; F02D 2200/023; F01P 3/12; F01P 7/14; F01P 7/16; F01P 7/162; F01P 7/164; F01P 2003/003; F01P 2025/08; F01M 1/16; F02B 39/10; B60K 11/085
See application file for complete search history.

(56) References Cited

U.S. PATENT DOCUMENTS

| 4,977,743 A | * | 12/1990 | Aihara | .................... F01P 7/026 123/41.31 |
| 5,186,081 A | | 2/1993 | Richardson et al. | |
| 5,605,045 A | | 2/1997 | Halimi et al. | |

(Continued)

FOREIGN PATENT DOCUMENTS

| JP | 2006226155 A | 8/2006 |
| WO | 2014127298 A1 | 8/2014 |

OTHER PUBLICATIONS

"Motor Thermal Circuit," MathWorks Website, Available Online at https://www.mathworks.com/help/physmod/simscape/examples/motor-thermal-circuit.html, Available as Early as Nov. 1, 2014, 2 pages.

(Continued)

*Primary Examiner* — Grant Moubry
(74) *Attorney, Agent, or Firm* — Geoffrey Brumbaugh; McCoy Russell LLP

(57) ABSTRACT

Methods and systems for operating an engine with an electrically driven compressor are described. In one example, a model in a controller determines one or more temperatures of the electrically driven compressor to establish a power output upper threshold that is not to be exceeded by the electrically driven compressor. Various actuators may be adjusted responsive to the power output upper threshold to reduce the possibility of electrically driven compressor degradation.

20 Claims, 5 Drawing Sheets

(51) Int. Cl.
 *B60K 11/08* (2006.01)
 *F01P 3/00* (2006.01)

(56) References Cited

U.S. PATENT DOCUMENTS

| | | | |
|---|---|---|---|
| 5,906,098 A | 5/1999 | Woollenweber et al. | |
| 6,453,853 B1 | 9/2002 | Hawkins et al. | |
| 6,705,084 B2 | 3/2004 | Allen et al. | |
| 6,931,850 B2 | 8/2005 | Frank et al. | |
| 7,159,551 B2 | 1/2007 | Cecur et al. | |
| 7,174,714 B2 | 2/2007 | Algrain | |
| 7,260,933 B2 | 8/2007 | Barba et al. | |
| 7,367,189 B2 | 5/2008 | Ishiwatari | |
| 7,404,383 B2 | 7/2008 | Elendt | |
| 7,454,922 B2 * | 11/2008 | Zeigler | B60H 1/00378 123/41.19 |
| 8,109,092 B2 * | 2/2012 | Pursifull | F01N 11/00 123/559.1 |
| 8,209,981 B2 * | 7/2012 | Pursifull | F01N 11/00 123/559.1 |
| 8,439,002 B2 * | 5/2013 | Pursifull | F02B 69/06 123/21 |
| 9,605,603 B2 | 3/2017 | Glugla et al. | |
| 2006/0260304 A1 * | 11/2006 | Ishiwatari | F02B 37/10 60/599 |
| 2010/0051363 A1 | 3/2010 | Inoue et al. | |
| 2012/0323448 A1 | 12/2012 | Charnesky et al. | |
| 2014/0299077 A1 | 10/2014 | Sowards et al. | |
| 2015/0149043 A1 | 5/2015 | Macfarlane et al. | |
| 2017/0016388 A1 | 1/2017 | Xiao et al. | |

OTHER PUBLICATIONS

Xiao, B. et al., "Method and System for a Boosted Engine," U.S. Appl. No. 15/693,038, filed Aug. 31, 2017, 71 pages.
Mcconville, G. et al., "System and Method for Boost Control," U.S. Appl. No. 15/878,865, filed Jan. 24, 2018, 66 pages.
Buckland, J. et al., "System and Method for Boost Control," U.S. Appl. No. 15/878,915, filed Jan. 24, 2018, 65 pages.

\* cited by examiner

SYSTEM AND METHOD FOR OPERATING AN ENGINE WITH AN ELECTRICALLY DRIVEN COMPRESSOR

BACKGROUND/SUMMARY

An internal combustion engine may include a turbocharger compressor or a supercharger compressor to increase engine output. Turbocharger compressor output and mechanically driven supercharger compress output may be linked to engine output because exhaust gases may be required to rotate the turbocharger compressor and because the supercharger compressor may rotate at a speed that is a multiple of engine speed. As such, output of turbocharger compressors and supercharger compressors may not always be aligned with driver demand torque and vehicle operating conditions. One way to overcome the direct linkages between engine output and output of turbocharger or supercharger compressors may be to electrically drive the turbocharger compressor or supercharger compressor during some operating conditions. For example, an electrically driven turbocharger compressor or supercharger compressor may be operated when engine speed is zero to improve direct engine starting. Further, an electrically driven turbocharger compressor may be driven via an electric machine during engine operating conditions when exhaust gas flow is low so that turbocharger lag may be reduced when a vehicle's driver applies an accelerator pedal. As such, electrically driven turbocharger compressors and supercharger compressors may provide benefits that are not available via engine driven compressors. However, electrically driven turbocharges and superchargers may degrade if they are operated at high temperatures for extended periods of time. Therefore, integrated controllers within the electrically driven turbocharger compressors and supercharger compressors may limit output of electrically driven turbocharger compressors and supercharger compressors. This may reduce the possibility of electrically driven turbocharger compressor or supercharger compressor degradation, but it may also disturb engine torque production and vehicle occupants. Therefore, it may be desirable to reduce the possibility of electrically driven turbocharger compressor or supercharger degradation in a way that may be less disturbing to vehicle occupants.

The inventors herein have recognized the above-mentioned disadvantages and have developed an engine operating method, comprising: via a controller, reducing output of an electrically driven compressor that provides air to an engine according to a temperature of a liquid passing through the electrically driven compressor; and reducing the temperature of the liquid via reducing output of the engine via the controller.

By reducing output of an electrically driven compressor that provides air to an engine according to a temperature of a liquid that passes through the electrically driven compressor, it may be possible to reduce electrically driven compressor output while reducing output of an engine so that power reduction by the engine may be smoother than if output of the electrically driven compressor was reduced alone. For example, an engine controller may command a reduction in electric compressor output in conjunction or in cooperation with reducing engine torque via reducing an opening amount of an engine throttle so that the progression of engine torque reduction may be smoothed.

The present description may provide several advantages. In particular, the approach may reduce driveline torque disturbances that are related to operation of an electrically driven compressor. In addition, the approach may be applied to a wide variety of engine configurations. Further, the approach includes control actions to reduce the possibility of degradation of the electrically driven compressor.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
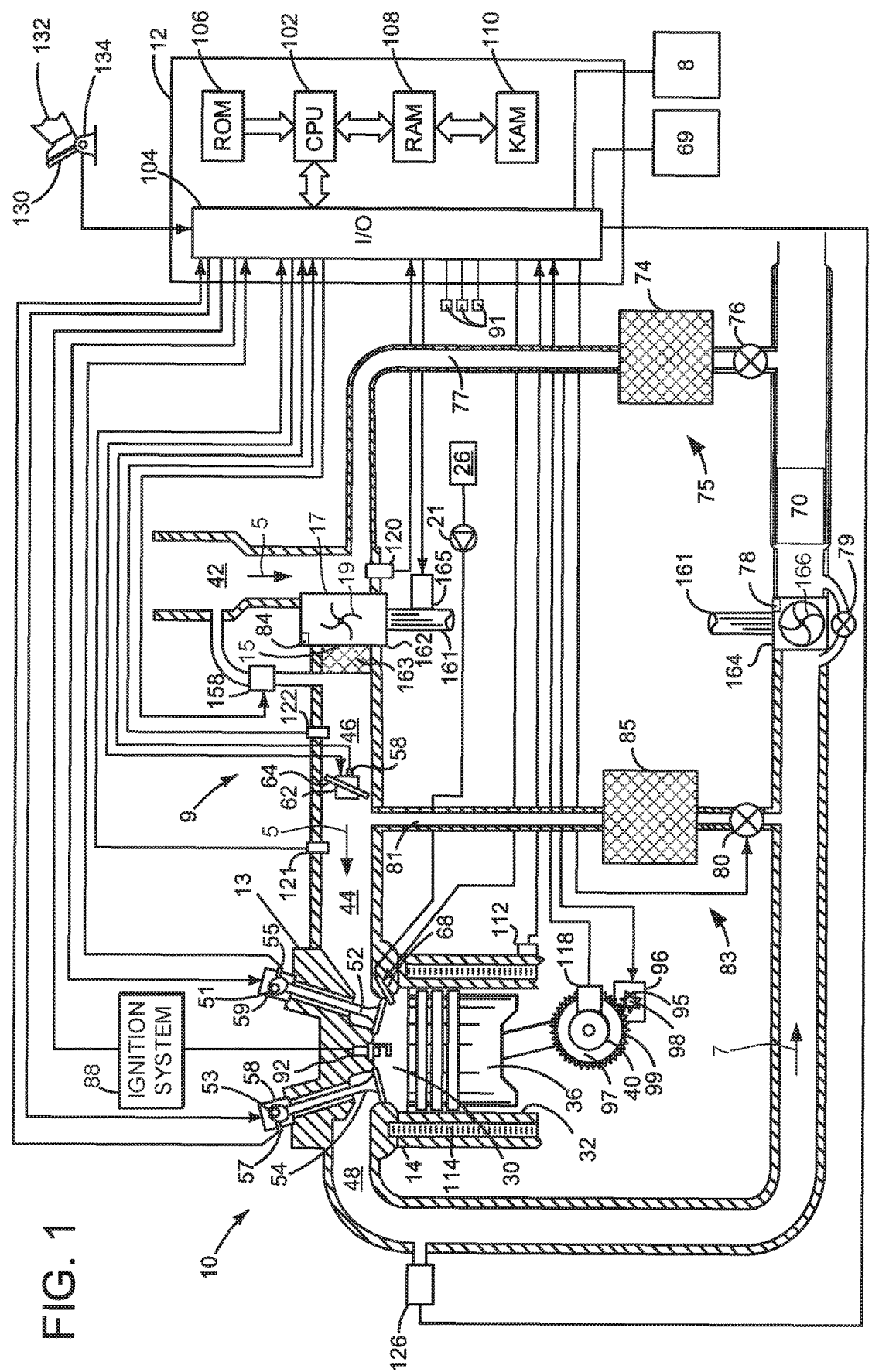
FIG. 1 shows a detailed schematic depiction of an example engine.
Figure 2A:
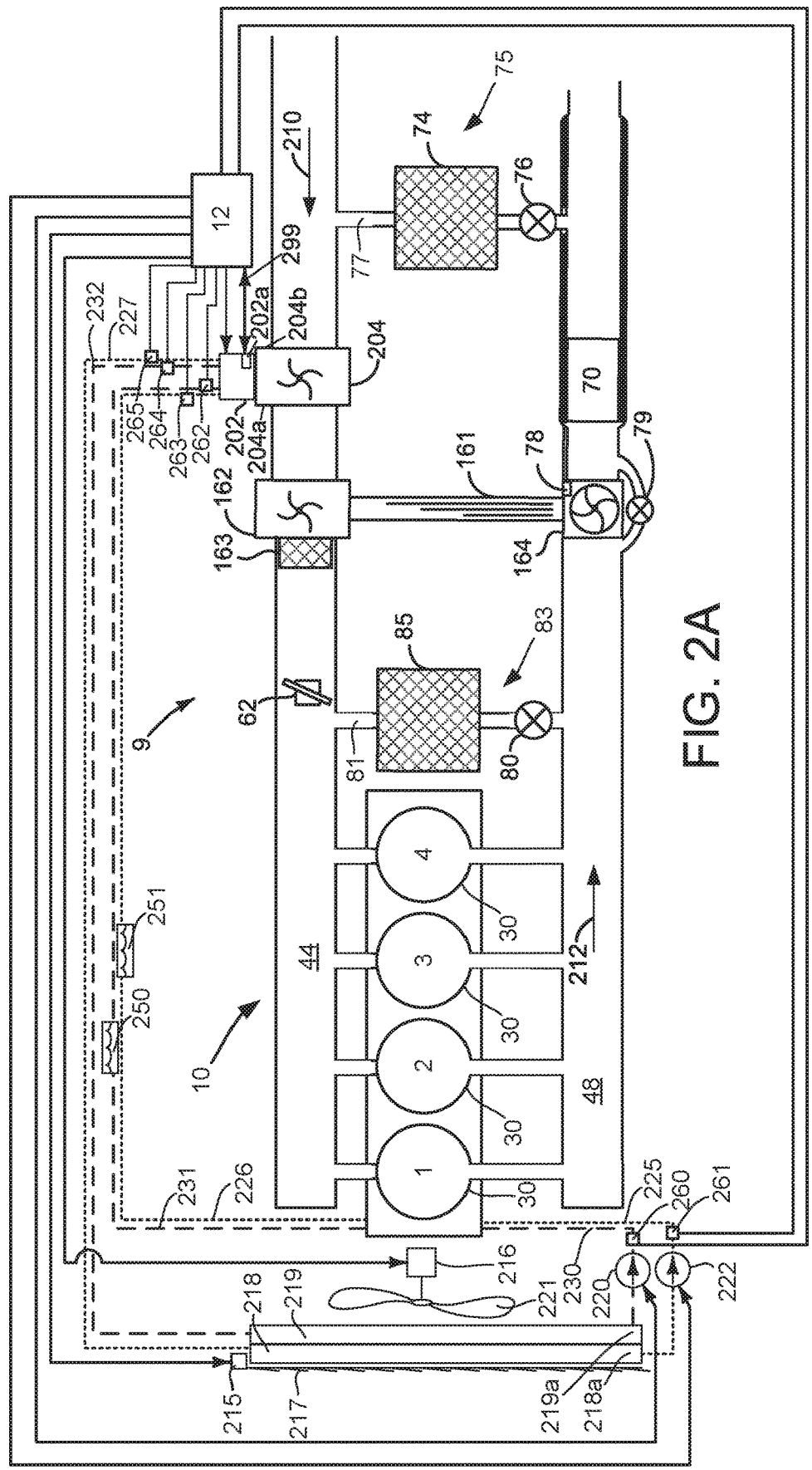
FIGS. 2A-2B show example engine system configurations for boosted engines.
Figure 2B:
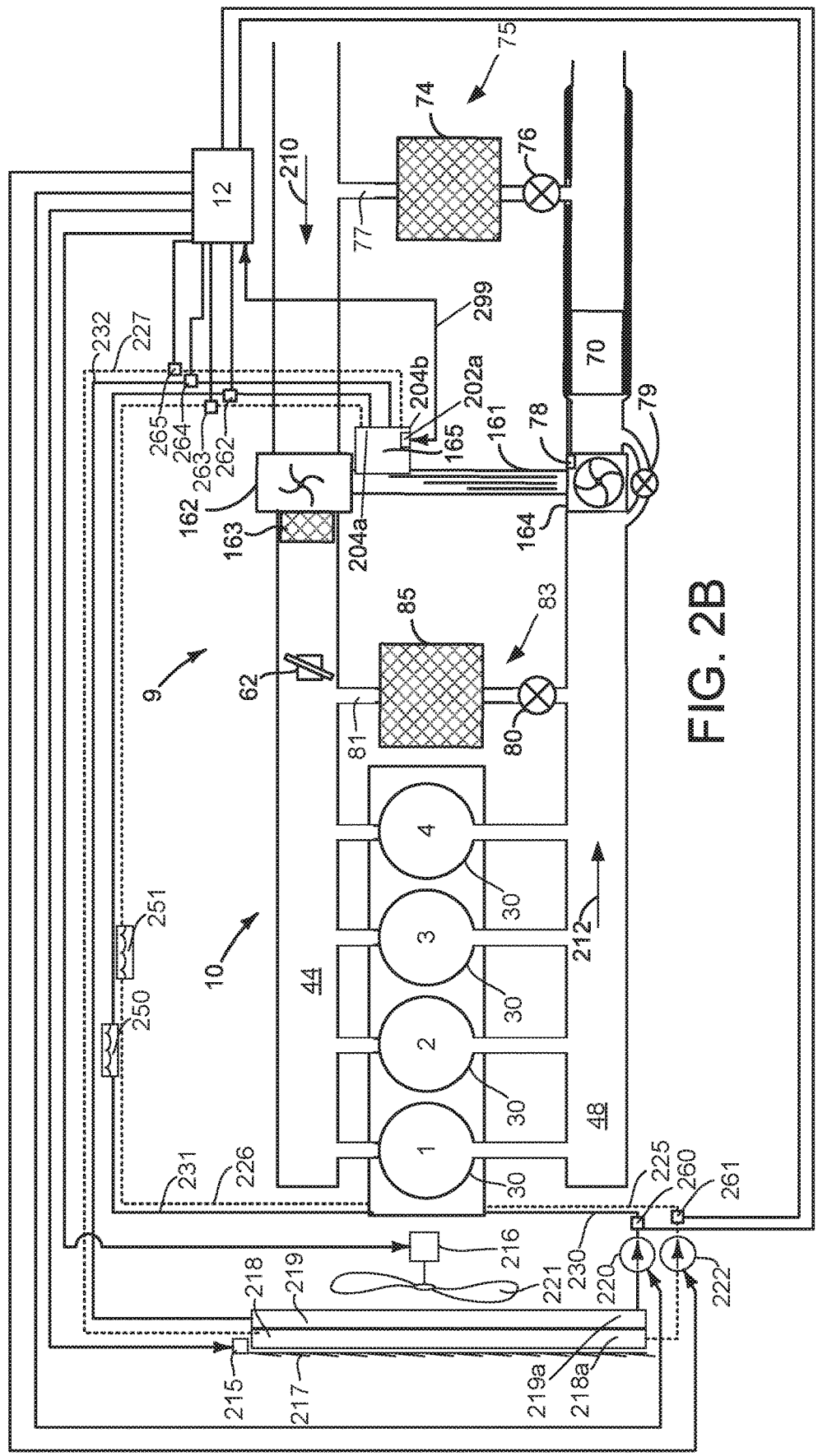
Figure 3:
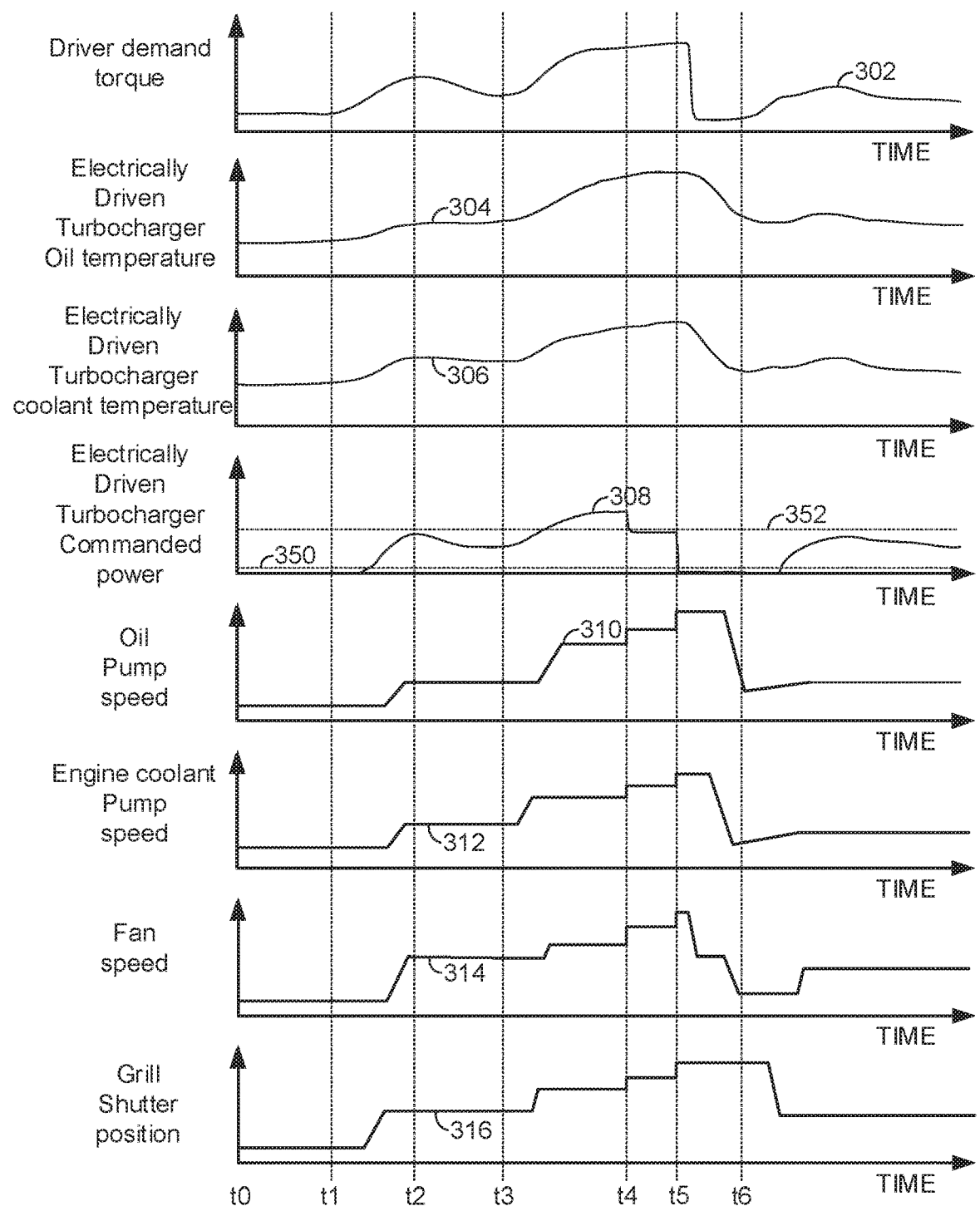
FIG. 3 shows an example engine operating sequence for a boosted engine.
Figure 4:
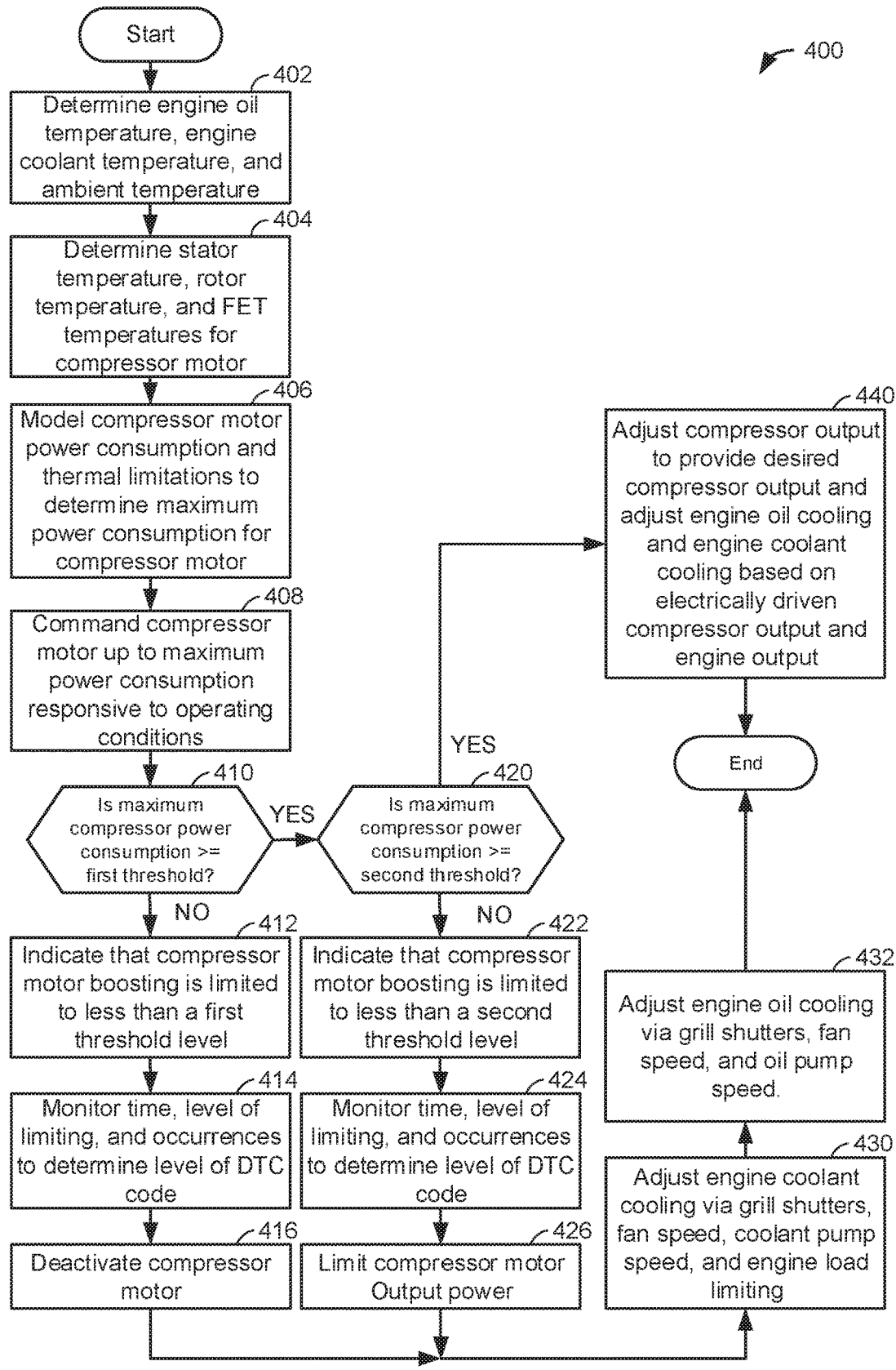
FIG. 4 shows a method for operating an engine.

The present description is related to operating an internal combustion engine that includes an electrically driven turbocharger or supercharger. FIG. 1 shows one example of an electrically boosted engine. By electrically boosting an amount of air supplied to an engine, it may be possible to provide significant amounts of compressed air to the engine while the engine is stopped and being cranked. Further, electrically boosting air supplied to the engine may improve engine torque response. FIGS. 2A-2B show example engine configurations where the present invention may be applied. A prophetic engine operating sequence according to the method described herein is shown in FIG. 3. A method for controlling an electrically driven compressor and engine is shown in FIG. 4.

Referring to FIG. 1, internal combustion engine 10, comprising a plurality of cylinders, one cylinder of which is shown in FIG. 1, is controlled by electronic engine controller 12. The controller 12 receives signals from the various sensors of FIG. 1 and employs the various actuators of FIG. 1 to adjust engine operation based on the received signals and instructions stored on a memory of the controller.

Engine 10 includes combustion chamber 30 and cylinder walls 32 with piston 36 positioned therein and connected to crankshaft 40. Cylinder head 13 is fastened to engine block 14. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Although in other examples, the engine may operate valves via a single camshaft or pushrods. The position of intake cam 51 may be determined by intake cam sensor 55. The position of exhaust cam 53 may be determined by exhaust cam sensor 57. Intake poppet valve 52 may be operated by a variable valve activating/deactivating actuator 59, which may be a cam driven valve operator (e.g., as shown in U.S. Pat. Nos. 9,605,603; 7,404,383; and 7,159,551 all of which are hereby fully incorporated by reference for all purposes). Likewise, exhaust poppet valve 54 may be operated by a variable valve activating/deactivating actuator 58, which may a cam driven valve operator (e.g., as shown in U.S. Pat. Nos. 9,605,603; 7,404,383; and 7,159,551 all of which are hereby fully incorporated by reference for all purposes). Intake poppet valve 52 and exhaust poppet valve 54 may be deactivated and held in a closed position preventing flow into and out of cylinder 30 for one or more entire engine cycles (e.g. two engine revolutions), thereby deactivating cylinder 30. Flow of fuel supplied to cylinder 30 may also cease when cylinder 30 is deactivated.

Fuel injector 68 is shown positioned in cylinder head 13 to inject fuel directly into combustion chamber 30, which is known to those skilled in the art as direct injection. Fuel is delivered to fuel injector 68 by a fuel system including a fuel tank 26, fuel pump 21, and fuel rail (not shown). In some examples, the fuel system includes a low pressure fuel pump and a high pressure fuel pump.

Engine air intake system 9 includes intake manifold 44, throttle 62, charge air cooler 163, turbocharger compressor 162, and intake plenum 42. Intake manifold 44 is shown communicating with optional electronic throttle 62 which adjusts a position of throttle plate 64 to control air flow from intake boost chamber 46. Compressor 162 draws air from air intake plenum 42 to supply boost chamber 46. Compressor vane actuator 84 adjusts a position of compressor vanes 19. Exhaust gases spin turbine 164 which is coupled to turbocharger compressor 162 via shaft 161. Compressor speed may be adjusted via adjusting a position of turbine variable vane control actuator 78 or compressor recirculation valve 158. In alternative examples, a waste gate 79 may replace or be used in addition to turbine variable vane control actuator 78. Turbine variable vane control actuator 78 adjusts a position of variable geometry turbine vanes 166. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 79 or a bypass valve may allow exhaust gases to flow around turbine 164 so as to reduce the amount of energy supplied to the turbine. Compressor recirculation valve 158 allows compressed air at the outlet 15 of compressor 162 to be returned to the inlet 17 of compressor 162. Alternatively, a position of compressor variable vane actuator 78 may be adjusted to change the efficiency of compressor 162. In this way, the efficiency of compressor 162 may be reduced so as to affect the flow of compressor 162 and reduce the possibility of compressor surge. Further, by returning air back to the inlet of compressor 162, work performed on the air may be increased, thereby increasing the temperature of the air. Optional electric machine (e.g., motor) 165 is also shown coupled to shaft 161. Optional electric machine 165 may rotate compressor 162 when engine 10 is not rotating, when engine 10 is rotating at low speed (e.g., cranking speed such as 250 RPM), when exhaust energy is low to provide additional boost, or on an as desired basis. Air flows into engine 10 in the direction of arrows 5.

Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99 such that starter 96 may rotate crankshaft 40 during engine cranking. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. An engine start may be requested via human/machine interface (e.g., key switch, pushbutton, remote radio frequency emitting device, etc.) 69 or in response to vehicle operating conditions (e.g., brake pedal position, accelerator pedal position, battery SOC, etc.). Battery 8 may supply electrical power to starter 96 and electric machine 165. Controller 12 may monitor battery state of charge.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126. Exhaust flows in the direction of arrow 7.

Exhaust gas recirculation (EGR) may be provided to the engine via high pressure EGR system 83. High pressure EGR system 83 includes valve 80, EGR passage 81, and EGR cooler 85. EGR valve 80 is a valve that closes or allows exhaust gas to flow from upstream of emissions device 70 to a location in the engine air intake system downstream of compressor 162. EGR may be cooled via passing through EGR cooler 85. EGR may also be provided via low pressure EGR system 75. Low pressure EGR system 75 includes EGR passage 77 and EGR valve 76. Low pressure EGR may flow from downstream of emissions device 70 to a location upstream of compressor 162. Low pressure EGR system 75 may include an EGR cooler 74.

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by human foot 132; a measurement of engine manifold pressure (MAP) from pressure sensor 121 coupled to intake manifold 44 (alternatively or in addition sensor 121 may sense intake manifold temperature); boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure, oil pressure, and ambient temperature may also be sensed via sensors 91 for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Engine 10 may be included in a variety of configurations, which are shown in FIGS. 2A-2B. The various engine configurations may include all or only a fraction of the components that are shown in FIG. 1. Further, some of the configurations may include additional components that are not shown in FIG. 1. Numeric labels for engine 10 and its associated components are maintained in FIGS. 2A-2B. Further, components shown in FIG. 1 and that are included in FIGS. 2A-2B operate as described according to FIG. 1 and are labeled with the same numeric labels. Therefore, for the sake of brevity, the description of these elements will not be repeated. In addition, once a new component has been introduced in FIGS. 2A-2B and described, its description will not be repeated for the sake of brevity.

Referring now to FIG. 2A, engine 10 is shown with four individual cylinders 30 that are numbered 1-4. In this example, engine 10 includes an electrically driven compressor 204 that includes electric machine 202 and that may be rotated via electric machine 202 to operate as a supercharger. Electrically machine 202 may include a controller 202a that may communicate with controller 12 via a controller area network (CAN) 299. Electric machine 202 is positioned upstream of turbocharger compressor 162 and it may be selectively activated and deactivated via controller 12. In addition, the speed of electric machine 202 and electrically driven compressor 204 may be controlled and adjusted via controller 12 to control boost pressure. Turbocharger compressor 162 is driven only via turbine 164 and it is not driven via an electric machine. Air flows into engine 10 in the direction of arrow 210 and exhaust flows out of engine 10 in the direction of arrow 212.

In this example configuration, a speed of electrically driven compressor 204 may be adjusted to pressurize air entering engine 10 during conditions where exhaust flow is low and driver demand torque is high. Further, the speed of electrically driven compressor 204 may be adjusted to increase air flow to the engine when driver demand torque is high and engine speed is high. The speed of electrically driven compressor 204 may be adjusted independently from the speed of turbocharger compressor 162.

Electrically driven compressor 204 including electric machine 202 may be lubricated and cooled via engine oil 250. Passages or conduits represented by large dashed lines 230, 231, and 232 carry engine oil from engine 10 and oil cooler 219 to electrically driven compressor 204 and electric machine 202. Oil pump 220 may be selectively activated via controller 12 to move engine oil through engine 10, electrically driven compressor 204, and electric machine 202. Electrically driven compressor 204 including electric machine 202 may be cooled via engine coolant 251 (e.g., a mixture of water and glycol). Passages or conduits represented by small dashed lines 225, 226, and 227 carry engine coolant from engine 10 and radiator 218 to electrically driven compressor 202 and electric machine 202. Coolant pump 222 may be selectively activated via controller 12 to move engine coolant through engine 10, electrically driven compressor 204, and electric machine 202. Fan 221 may also be selectively activated via controller 12 by supplying electrical power to electric machine 216. Fan 221 may motivate air flow across radiator 218 and oil cooler 219 to cool engine oil 250 and engine coolant 251. Grill shutters 217 may also be selectively opened and closed to increase cooling of engine oil 250 and engine coolant 251 via actuator 215. Grill shutters 217 are shown in a fully closed position. Opening grill shutters 217 via controller 12 increases cooling of engine oil 250 and engine coolant 251 while closing grill shutters 217 reduces cooling of engine oil 250 and engine coolant 251. Speeds of electric machine 216, pump 220, and pump 222 may be increased to increase cooling of engine oil 250 an engine coolant via controller 12. Speeds of electric machine 216, pump 220, and pump 222 may be decreased to decrease cooling of engine oil 250 an engine coolant via controller 12.

Engine coolant temperature at the outlet side 218a of radiator 218 may be sensed via temperature sensor 261. Further, engine coolant temperature at inlet 204a side of electrically driven compressor 204 may be determined via temperature sensor 263. Engine coolant temperature at outlet 204b side of electrically driven compressor 204 may be determined via temperature sensor 265. Engine oil temperature at the outlet side 218a of oil cooler 219 may be sensed via temperature sensor 260. In addition, engine oil temperature at inlet 204a side of electrically driven compressor 204 may be determined via temperature sensor 262. Engine oil temperature at outlet 204b side of electrically driven compressor 204 may be determined via temperature sensor 264. Flow of engine oil through pump 220 and passages 230, 231, and 232 may be determined from the speed of pump 220. Flow of engine coolant through pump 222 and passages 225, 226, and 227 may be determined from the speed of pump 222.

Referring now to FIG. 2B, engine 10 is shown again with four individual cylinders 30 that are numbered 1-4. In this example, engine 10 includes an electrically driven turbocharger compressor 162 that includes electric machine 165 and that may be rotated via electric machine 165. Turbocharger compressor 162 and electric machine 165 may be cooled via engine coolant 251. Electrically machine 165 may include a controller 202a that may communicate with controller 12 via a controller area network (CAN) 299. Further, turbocharger compressor 162 and electric machine 165 may be cooled and lubricated via engine oil 250. The speed of electric machine 165 is the same as or a ratio of the speed of turbocharger compressor 162. Air flows into engine 10 in the direction of arrow 210 and exhaust flows out of engine 10 in the direction of arrow 212.

Electric machine 165 may assist turbine 164 during conditions when engine exhaust flow is low and driver demand torque is high to increase air flow into engine 10. Further, electric machine 165 may operate as a generator when engine exhaust flow is high and engine air flow is low to reduce compressor surge and generate electrical power.

The system of FIGS. 1-2B provide for an engine system, comprising: an internal combustion engine; an electrically driven compressor coupled to the engine; and a controller including executable instructions stored in non-transitory memory to deactivate the electric machine according to output of a model that describes a temperature of the electrically driven compressor as a function of a temperature of a liquid and a flow rate of the liquid through the electrically driven compressor. The engine system further comprises a second controller integrated with the electric machine, and additional instructions to communicate that the second controller is commanded to deactivate the electric machine. The engine system further comprises additional instructions to reduce output of the electric machine according to output of the model that describes the temperature of the electrically driven compressor as the function of the temperature of the liquid and the flow rate of the liquid through the electrically driven compressor. The engine system includes where the liquid is engine coolant that includes glycol. The engine system includes where the temperature of the electrically driven compressor is a temperature of a transistor included with the electrically driven compressor.

Referring now to FIG. 3, an example prophetic engine operating sequence for an engine is shown. The operating sequence of FIG. 3 may be produced via the system of FIGS. 1-2B executing instructions of the method described in FIG. 4. The plots of FIG. 3 are aligned in time and occur at the same time. Vertical markers at t0-t6 indicate times of particular interest during the sequence.

The first plot from the top of FIG. 3 is a plot of driver demand torque versus time. Trace 302 represents driver demand torque. The vertical axis represents driver demand torque and driver demand torque increases in the direction of the horizontal axis arrow. Trace 302 represents driver demand torque. The horizontal axis represents time and time increases from the left side to right side of the figure. Driver demand torque may be determined from accelerator pedal position and vehicle speed. In one example, driver demand torque and vehicle speed reference or index a table or function that outputs empirically determined values of driver demand torque. The driver demand torque values may be determined while operating a vehicle on a road and determining driver demand torque values that provide a desired level of vehicle acceleration relative to accelerator pedal position.

The second plot from the top of FIG. 3 represents a temperature of the electrically driven turbocharger oil temperature versus time. The vertical axis represents electrically driven turbocharger oil temperature and electrically driven turbocharger oil temperature increases in the direction of the vertical axis arrow. The horizontal axis represents time and time increases from the left side to right side of the figure. Trace 304 represents the electrically driven turbocharger oil temperature.

The third plot from the top of FIG. 3 represents a coolant temperature of the electrically driven turbocharger coolant temperature versus time. The vertical axis represents electrically driven turbocharger coolant temperature and electrically driven turbocharger coolant temperature increases in the direction of the vertical axis arrow. The horizontal axis represents time and time increases from the left side to right side of the figure. Trace 306 represents the electrically driven turbocharger coolant temperature.

The fourth plot from the top of FIG. 3 represents electrically driven turbocharger commanded power output versus time. The vertical axis represents commanded electrically driven turbocharger output power and electrically driven turbocharger output power increases in the direction of the vertical axis arrow. The horizontal axis represents time and time increases from the left side to right side of the figure. Increasing output power of the electrically driven turbocharger may increase flow through the electrically driven compressor. Horizontal line 352 represents a first threshold electric turbocharger output.

Electrically driven turbocharger output may be prevented from exceeding first threshold 352 by limiting an amount of electrical power that is provided to the electrically driven turbocharger when one or more temperatures of the electrically driven turbocharger exceed a first threshold temperature. Thus, the power output of the electrically driven turbocharger may be limited to a power that is less than the power of first threshold 352. Horizontal line 350 represents a second threshold electric turbocharger output. Electrically driven turbocharger output power may be prevented from exceeding second threshold 350 by limiting an amount of electrical power that is provided to the electrically driven turbocharger when one or more temperatures of the electrically driven turbocharger exceed a second threshold temperature. Accordingly, the power output of the electrically driven turbocharger may be limited to a power that is less than the power of second threshold 350. Trace 308 represents recirculation commanded electrically driven compressor output power.

The fifth plot from the top of FIG. 3 represents oil pump speed versus time. The vertical axis represents oil pump speed and oil pump speed increases in the direction of the vertical axis arrow. The horizontal axis represents time and time increases from the left side to right side of the figure. Trace 310 represents engine oil pump speed.

The sixth plot from the top of FIG. 3 represents engine coolant pump speed versus time. The vertical axis represents engine coolant pump speed and coolant pump speed increases in the direction of the vertical axis arrow. The horizontal axis represents time and time increases from the left side to right side of the figure. Trace 312 represents engine coolant pump speed.

The seventh plot from the top of FIG. 3 represents engine fan (e.g., 221 of FIGS. 2A-2B) speed versus time. The vertical axis represents engine fan speed and engine fan speed increases in the direction of the vertical axis arrow. The horizontal axis represents time and time increases from the left side to right side of the figure. Trace 314 represents engine fan speed.

The eighth plot from the top of FIG. 3 shows grill shutter position versus time. The vertical axis represents grill shutter position and the grill shutter opening amount and position increases in the direction of the vertical axis arrow. Increasing the grill opening amount may allow increased air flow through the radiator and oil cooler as well as through the engine compartment of the vehicle so as to increase cooling. The horizontal axis represents time and time increases from the left side to right side of the figure. Trace 316 represents grill shutter position.

At time t0, driver demand torque is low and electrically driven turbocharger temperature is low. The electrically driven turbocharger coolant temperature is at a middle level and the electrically driven turbocharger commanded power is zero. The engine oil pump speed is low and the engine coolant pump speed is low. The engine fan speed is low and the grill shutters are open a small amount. Such conditions may be indicative of operating the vehicle in which the engine resides at a low speed.

At the time t1, the driver (not shown) increases the driver demand torque and the electrically driven turbocharger oil temperature remains at a lower level. The electrically driven turbocharger coolant temperature is at the medium level and the electrically driven turbocharger commanded output power is zero. The engine oil pump speed and coolant pump speeds remain low. The engine fan speed is also low and the grill shutters are open a small amount.

Between time t1 and time t2, the driver demand torque increases and the electrically driven turbocharger oil temperature increases. The electrically driven coolant temperature also increases and the electrically driven turbocharger commanded power increases as the driver demand torque increases. The engine oil pump speed is increased and the coolant pump speed is increased to increase cooling of the engine and the electrically driven compressor as the driver demand torque increases. The engine fan speed is also increased to increase cooling of the engine and electrically driven turbocharger compressor as the driver demand torque increases. The grill shutter is opened further as the driver demand torque increases.

At time t2, the driver demand torque begins to decrease, but the electrically driven turbocharger oil temperature and coolant temperature are at higher levels. The electrically driven turbocharger commanded power is reduced in response to the reduced driver demand torque. The engine oil pump speed and engine coolant pump speed remain at elevated levels and the engine fan speed is also at an elevated level. The grill shutters remain open.

At time t3, the driver demand torque begins to increase again and the electrically driven turbocharger oil temperature and coolant temperature are still at higher levels. The electrically driven turbocharger commanded power is increased in response to the reduced driver demand torque. The engine oil pump speed and engine coolant pump speed also remain at elevated levels and the engine fan speed is also at an elevated level. The grill shutters remain open.

At time t4, the driver demand torque remains at a high level and the electrically driven turbocharger oil temperature and the electrically driven turbocharger coolant temperatures are at higher levels that cause the controller to reduce the electrically driven turbocharger commanded power output to reduce the possibility of degrading the electrically driven turbocharger. By reducing power output of the electrically driven turbocharger, temperature of the electrically driven turbocharger may be reduced. The engine oil pump speed and engine coolant pump speed are increased in response to the elevated oil and coolant temperatures of the electrically driven turbocharger. Further, the engine fan speed is increased and the grill shutters are opened further in response to the elevated oil and coolant temperatures of the electrically driven turbocharger. In other examples, the rate of reduction in the electrically driven turbocharger output command may be decreased to provide a smoother torque transition.

Between time t4 and time t5, the driver increases the driver demand torque even more. Then at time t5, the controller further reduces the electrically driven turbocharger output to zero so as to reduce the possibility of turbocharger degradation. The engine oil pump speed and engine coolant pump speed are increased again in response to the elevated oil and coolant temperatures of the electrically driven turbocharger. Further, the engine fan speed is increased again and the grill shutters are opened even further in response to the elevated oil and coolant temperatures of the electrically driven turbocharger. Heat generated via the engine in response to the high driver demand torque may keep the oil and coolant temperatures elevated.

Shortly after time t5, the driver (not shown) reduces the driver demand torque. But, because the engine oil temperature is high and because engine coolant temperature is high, the engine oil pump speed and engine coolant pump speed remain at elevated levels. Further, the engine fan speed remains at a higher level and the grill shutters are fully open.

Between time t5 and time t6, the driver demand torque remains low and the electrically driven turbocharger oil temperature and coolant temperature are reduced. The engine oil pump speed and the coolant pump speed are reduced as the electrically driven turbocharger oil temperature and coolant temperature are reduced.

At time t6, the driver increases the driver demand torque and the electrically driven turbocharger commanded power is increased to provide air to meet the driver demand torque. The electrically driven turbocharger oil temperature and coolant temperature have been reduced to a level that allows the electrically driven turbocharger commanded power to provide air flow to meet the driver demand torque.

In this way, operation of an electrically driven turbocharger or compressor may be controlled to reduce the possibility of turbocharger degradation. Further, adjustments to various vehicle actuators may be made to reduce the rate of temperature increases of the electrically driven turbocharger and the engine.

Referring now to FIG. 4, a method for operating an engine is shown. In particular, a flowchart of a method for operating an internal combustion engine that includes an electrically driven turbocharger and/or compressor is shown. The method of FIG. 4 may be stored as executable instructions in non-transitory memory in systems such as shown in FIGS. 1-2B. The method of FIG. 4 may be incorporated into and may cooperate with the systems of FIGS. 1-2B. Further, at least portions of the method of FIG. 4 may be incorporated as executable instructions stored in non-transitory memory while other portions of the method may be performed via a controller transforming operating states of devices and actuators in the physical world. The controller may employ engine actuators of the engine system to adjust engine operation, according to the method described below. Further, method 400 may determine selected control parameters from sensor inputs.

At 402, method 400 determines engine oil temperature, engine coolant temperature, and ambient temperature. Method 400 determines the temperatures from outputs of sensors. Method 400 proceeds to 404.

At 404, method 400 determines one or more temperatures of the electrically driven turbocharger or compressor. In one example, method 400 applies an empirically determined model to determine the temperatures of the electrically driven turbocharger or compressor. In particular, method 400 indexes or references a table or function of empirically determined values of electrically driven turbocharger or compressor stator temperature via electrically driven turbocharger coolant inlet coolant temperature, flow rate of coolant through the electrically driven turbocharger compressor or electrically driven compressor, electrically driven turbocharger oil inlet oil temperature, flow rate of oil through the electrically driven turbocharger compressor or electrically driven compressor, and electrically driven turbocharger electrical power presently being consumed. The table or function outputs an electrically driven turbocharger or compressor stator temperature. Further, method 400 indexes or references a second table or function of empirically determined values of electrically driven turbocharger or compressor rotor temperature via electrically driven turbocharger coolant inlet coolant temperature, flow rate of coolant through the electrically driven turbocharger compressor or electrically driven compressor, electrically driven turbocharger oil inlet oil temperature, flow rate of oil through the electrically driven turbocharger compressor or electrically driven compressor, and electrically driven turbocharger electrical power presently being consumed. The second table or function outputs an electrically driven turbocharger or compressor rotor temperature. Method 400 also indexes or references a third table or function of empirically determined values of electrically driven turbocharger or compressor field effect transistor (FET) temperature via electrically driven turbocharger coolant inlet coolant temperature, flow rate of coolant through the electrically driven turbocharger compressor or electrically driven compressor, electrically driven turbocharger oil inlet oil temperature, flow rate of oil through the electrically driven turbocharger compressor or electrically driven compressor, and electrically driven turbocharger electrical power presently being consumed. The third table or function outputs an electrically driven turbocharger or compressor FET temperature.

Alternatively, the stator temperature, rotor temperature, and FET temperature may be estimated via first principles models. Method 400 proceeds to 406.

At 406, method 400 determines a threshold electrical power consumption level for the electrically driven turbocharger or compressor. The threshold electrical power consumption level may vary with operating conditions of the electrically driven turbocharger or compressor. In one example, method 400 indexes or references a table or function of empirically determined values of electrically driven turbocharger or compressor maximum electrical power input levels via FET temperature, rotor temperature, and stator temperature that were determined at 404. The table or function outputs a maximum electrically driven turbocharger or compressor electrical power consumption level (e.g., an upper threshold of electrical power consumed by the electrically driven compressor that is not to be exceeded). Method 400 proceeds to 408.

At 408, method 400 determines a command for the electrically driven compressor to a desired power output level. The command for the electrically driven compressor may be based on a desired output power level of the electrically driven turbocharger compressor that is determined from driver demand torque, engine speed, and a pressure ratio that is across the electrically driven compressor. For example, the electrically driven compressor may be increased as driver demand torque increases and engine speed increases. The command may be determined via a lookup table or function that holds empirically determined values of electrically driven turbocharger output that are indexed or referenced via driver demand torque, engine speed, and the pressure ratio that is across the electrically driven compressor. Method 400 proceeds to 410.

At 410, method 400 judges and/or determines if the maximum electrically driven turbocharger or compressor electrical power consumption level determined at 406 is greater than or equal to a first threshold level (e.g., 3000 Watts). If so, the answer is yes and method 400 proceeds to 420. Otherwise, the answer is no and method 400 proceeds to 412.

At 412, method 400 indicates that output of the electrically driven compressor is limited or restricted to less than a first threshold amount of power. Method 400 may provide the indication via a human/machine interface. Method 400 proceeds to 414.

At 414, method 400 monitors an amount of time, a total number of occurrences, and the maximum electrically driven turbocharger or compressor electrical power consumption level to determine a level of a diagnostic trouble code (DTC) that may be output to the human/machine interface. Method 400 proceeds to 416.

At 416, method 400 deactivates the electrically driven turbocharger compressor or electrically driven compressor to reduce the possibility of electrically driven turbocharger compressor degradation. In one example, method 400 reduces the amount of electrical power that is supplied to the electrically driven turbocharger compressor or electrically driven compressor gradually over time to zero to reduce any torque disturbance that may be observed by occupants of the vehicle. The command to the electrically driven turbocharger compressor may be reduced to zero and it is output to the electrically driven turbocharger compressor via a CAN message or a voltage and current that drives the electrically driven turbocharger compressor. In other examples, method 400 may provide a step wise reduction in electrical power that is supplied to the electrically driven turbocharger. Method 400 proceeds to 430.

Alternatively, method 400 may reduce the amount of electrical power that is supplied to the electrically driven turbocharger compressor or electrically driven compressor gradually over time to a low predetermined value (e.g., less than 5% of full rated power of the electrically driven compressor) to cool the electrically driven compressor. By reducing electrically driven compressor output without deactivating the electrically driven compressor, air flow to the engine by the electrically driven compressor may be maintained to reduce engine torque disturbances. At 430, method 400 adjusts engine coolant cooling and electrically driven turbocharger cooling via adjusting the position of grill shutters, coolant pump speed, engine fan speed, and engine load to reduce the possibility of electric turbocharger degradation. For example, grill shutters may be fully opened, engine fan speed may be adjusted to a maximum speed, and coolant pump speed may be adjusted to maximum speed to increase engine cooling and cooling of the electrically driven turbocharger compressor or electrically driven compressor when output to the electrically driven compressor is constrained to less than the first threshold level. Grill shutters may be opened to a first predetermined position (e.g., 75% of fully open), engine fan speed may be adjusted to a first predetermined speed (e.g., 75% of maximum speed), and coolant pump speed may be adjusted to a second predetermined speed (e.g., 75% of maximum speed) to increase engine cooling and cooling of the electrically driven turbocharger compressor or electrically driven compressor when output to the electrically driven compressor is constrained to less than the second threshold level. Further, engine load may be reduced via at least partially reducing the engine throttle opening amount, thereby limiting a maximum torque that the engine may produce. Engine cam timing and spark timing may also be adjusted to limit or reduce engine torque output when output of the electrically driven compressor is constrained to less than the first threshold level or less than the second threshold level. Method 400 proceeds to 432.

At 432, method 400 adjusts engine oil cooling and electrically driven turbocharger compressor oil cooling via adjusting the position of grill shutters, coolant pump speed, engine fan speed, and engine load to reduce the possibility of electric turbocharger degradation. For example, grill shutters may be fully opened, engine fan speed may be adjusted to a maximum speed, and oil pump speed may be adjusted to maximum speed to increase engine oil cooling and oil cooling for the electrically driven turbocharger compressor or electrically driven compressor when output to the electrically driven compressor is constrained to less than the first threshold level. Grill shutters may be opened to a first predetermined position (e.g., 75% of fully open), engine fan speed may be adjusted to a third predetermined speed (e.g., 75% of maximum speed), and oil pump speed may be adjusted to a fourth predetermined speed (e.g., 75% of maximum speed) to increase engine oil cooling and oil cooling of the electrically driven turbocharger compressor or electrically driven compressor when output to the electrically driven compressor is constrained to less than the second threshold level. Method 400 proceeds to exit.

At 420, method 400 judges and/or determines if the maximum electrically driven turbocharger or compressor electrical power consumption level determined at 406 is greater than or equal to a second threshold level (e.g., 5500 Watts). If so, the answer is yes and method 400 proceeds to 440. Otherwise, the answer is no and method 400 proceeds to 422.

At 422, method 400 indicates that output of the electrically driven compressor is limited or restricted to less than a second threshold amount of power. Method 400 may provide the indication via a human/machine interface. Method 400 proceeds to 424.

At 424, method 400 monitors an amount of time, a total number of occurrences, and the maximum electrically driven turbocharger or compressor electrical power consumption level to determine a level of a diagnostic trouble code (DTC) that may be output to the human/machine interface. Method 400 proceeds to 426.

At 426, method 400 deactivates reduces output of the electrically driven turbocharger compressor or electrically driven compressor to reduce the possibility of electrically driven turbocharger compressor degradation. In one example, method 400 reduces the amount of electrical power that is supplied to the electrically driven turbocharger compressor or electrically driven compressor gradually over time to reduce any torque disturbance that may be observed by occupants of the vehicle. The command to the electrically driven turbocharger compressor may be reduced to the second threshold level and it is output to the electrically driven turbocharger compressor via a CAN message or a voltage and current that drives the electrically driven turbocharger compressor. In other examples, method 400 may provide a step wise reduction in electrical power that is supplied to the electrically driven turbocharger. For example, method 400 may reduce output of the electrically driven compressor by 25%. Method 400 proceeds to 430.

At 440, method 400 adjusts output of the electrically driven compressor to provide a desired level of output. In one example, method 400 commands the electrically driven compressor via supplying a voltage and a current to the electrically driven compressor. Alternatively, method 400 may request a power output level via a CAN and output power of the electrically driven compressor is controlled via a controller within the electrically driven compressor to provide the desired output power level. Method 400 may command the electrically driven compressor to a desired output power level to the level determined at 408. The command from method 400 to the electrically driven compressor does not exceed threshold electrical power consumption level determined at 406. In this way, method 400 controls output of the electrically driven compressor so that the driver demand torque may be provided without exceeding threshold limits of the electrically driven compressor. Further, method 400 adjusts speed of the engine oil pump, engine coolant, pump and engine fan responsive to the driver demand torque. For example, method 400 may index or reference tables or functions using driver demand torque and the tables or functions output empirically determined engine oil pump speed, engine coolant pump speed, and engine fan speed. Further, the tables or functions may also be referenced via the desired output of the electrically driven turbocharger compressor or electrically driven compressor. Thus, the engine oil pump speed, engine coolant pump speed, and engine fan speed may be adjusted proportionately with driver demand torque and output of the electrically driven turbocharger compressor or electrically driven compressor. Similarly, method 400 may command an opening amount of grill shutters proportionately with driver demand torque and output of the electrically driven turbocharger compressor or electrically driven compressor via tables or function that are referenced via driver demand torque and output of the electrically driven turbocharger compressor. Method 400 proceeds to exit.

In this way, an amount of electrical power that is provided to an electrically driven turbocharger compressor or an electrically driven compressor may be adjusted to reduce the possibility of degradation. Further, engine torque may be gradually limited while gradually limiting electrically driven turbocharger compressor or electrically driven compressor output to improve vehicle drivability.

The method of FIG. 4 provides for an engine operating method, comprising: via a controller, reducing output of an electrically driven compressor that provides air to an engine according to a temperature of a liquid passing through the electrically driven compressor; and reducing the temperature of the liquid via reducing output of the engine via the controller. The engine method includes where the liquid is engine oil. The engine method includes where the liquid is engine coolant. The engine method further comprises modeling a temperature of the electrically driven compressor based on the temperature of the liquid and limiting output of the electrically driven compressor in response to the temperature of the electrically driven compressor. The engine method further comprises reducing the temperature of the liquid via opening grill shutters in response to the temperature of the electrically driven compressor. The engine method further comprises reducing the temperature of the liquid via increasing a fan speed in response to the temperature of the electrically driven compressor. The engine method further comprises reducing the temperature of the liquid via increasing a rate of flow through a pump in response to the temperature of the electrically driven compressor. The engine method includes where reducing output of the engine includes reducing a throttle opening amount of the engine.

The method of FIG. 4 also provides for an engine operating method, comprising: via a controller, reducing output of an electrically driven compressor that provides air to an engine according to an upper threshold output of the electrically driven compressor, the upper threshold output of the electrically driven compressor based on a temperature of a liquid that passes through the electrically driven compressor and the engine; and via the controller, adjusting a device to reduce the temperature of the liquid in response to reducing the upper threshold. The engine method further comprises reducing the upper threshold based on the temperature of the liquid that passes through the electrically driven compressor, a speed of the motor, and a temperature of a transistor included with the electrically driven compressor. The engine method includes where adjusting the device includes closing a throttle. The engine method includes where adjusting the device includes increasing an opening amount of radiator shutters. The engine method includes where adjusting the device includes increasing a speed of a pump. The engine method includes where adjusting the device includes increasing a speed of an oil pump. The engine method includes where the liquid is engine coolant that includes glycol.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
via a controller, reducing output of an electrically driven compressor that provides air to an engine according to a temperature of a liquid passing through the electrically driven compressor; and
reducing the temperature of the liquid via reducing output of the engine via the controller.

2. The engine method of claim 1, where the liquid is engine oil.

3. The engine method of claim 1, where the liquid is engine coolant.

4. The engine method of claim 1, further comprising modeling a temperature of the electrically driven compressor based on the temperature of the liquid and limiting output of the electrically driven compressor in response to the temperature of the electrically driven compressor.

5. The engine method of claim 4, further comprising reducing the temperature of the liquid via opening grill shutters in response to the temperature of the electrically driven compressor.

6. The engine method of claim 4, further comprising reducing the temperature of the liquid via increasing a fan speed in response to the temperature of the electrically driven compressor.

7. The engine method of claim 4, further comprising reducing the temperature of the liquid via increasing a rate of flow through a pump in response to the temperature of the electrically driven compressor.

8. The engine method of claim 1, where reducing output of the engine includes reducing a throttle opening amount of the engine.

9. An engine operating method, comprising:
via a controller, reducing output of an electrically driven compressor that provides air to an engine according to an upper threshold output of the electrically driven compressor, the upper threshold output of the electrically driven compressor based on a temperature of a liquid that passes through the electrically driven compressor and the engine; and
via the controller, adjusting a device to reduce the temperature of the liquid in response to reducing the upper threshold.

10. The engine method of claim 9, further comprising reducing the upper threshold based on the temperature of the liquid that passes through the electrically driven compressor, a speed of the motor, and a temperature of a transistor included with the electrically driven compressor.

11. The engine method of claim 9, where adjusting the device includes closing a throttle.

12. The engine method of claim 9, where adjusting the device includes increasing an opening amount of radiator shutters.

13. The engine method of claim 9, where adjusting the device includes increasing a speed of a pump.

14. The engine method of claim 9, where adjusting the device includes increasing a speed of an oil pump.

15. The engine method of claim 9, where the liquid is engine coolant that includes glycol.

16. An engine system, comprising:
an internal combustion engine;
an electrically driven compressor coupled to the engine; and
a controller including executable instructions stored in non-transitory memory to deactivate an electric machine according to output of a model that describes a temperature of the electrically driven compressor as a function of a temperature of a liquid and a flow rate of the liquid through the electrically driven compressor.

17. The engine system of claim 16, further comprising a second controller integrated with the electric machine, and additional instructions to communicate that the second controller is commanded to deactivate the electric machine.

18. The engine system of claim 16, further comprising additional instructions to reduce output of the electric machine according to output of the model that describes the temperature of the electrically driven compressor as the function of the temperature of the liquid and the flow rate of the liquid through the electrically driven compressor.

19. The engine system of claim 16, where the liquid is engine coolant that includes glycol.

20. The engine system of claim 16, where the temperature of the electrically driven compressor is a temperature of a transistor included with the electrically driven compressor.

* * * * *